(12) United States Patent
Voth

(10) Patent No.: US 8,771,584 B2
(45) Date of Patent: Jul. 8, 2014

(54) APPARATUS FOR THE HEATING OF PLASTICS MATERIAL PRE-FORMS WITH STERILE ROOM

(75) Inventor: Klaus Voth, Obertraubling (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 13/163,664

(22) Filed: Jun. 17, 2011

(65) Prior Publication Data

US 2012/0038090 A1    Feb. 16, 2012

(30) Foreign Application Priority Data

Jul. 30, 2010    (DE) .......................... 10 2010 032 964

(51) Int. Cl.
*B29C 49/68* (2006.01)
(52) U.S. Cl.
USPC ........ 264/535; 422/291; 425/174.4; 425/225; 425/226; 425/526
(58) Field of Classification Search
USPC ......... 425/174.4, 225, 226, 526; 422/28, 291, 422/292, 301; 264/454, 535
See application file for complete search history.

(56) References Cited

U.S. PATENT DOCUMENTS

| | | | |
|---|---|---|---|
| 7,010,900 B2 * | 3/2006 | Grossmann et al. | ............. 53/167 |
| 2001/0010145 A1 * | 8/2001 | Tawa et al. | ....................... 53/425 |
| 2009/0317506 A1 * | 12/2009 | Adriansens | .................... 425/103 |
| 2011/0133369 A1 | 6/2011 | Martini et al. | |

FOREIGN PATENT DOCUMENTS

| WO | 2006/105769 A1 | 10/2006 |
|---|---|---|
| WO | 2010/020529 A2 | 2/2010 |

OTHER PUBLICATIONS

European Search Report dated Dec. 19, 2012, issued in counterpart European Application No. EP 11 17 2989.

* cited by examiner

*Primary Examiner* — Robert B Davis
(74) *Attorney, Agent, or Firm* — Novak Druce Connolly Bove + Quigg LLP

(57) ABSTRACT

An apparatus for the heating of plastics material pre-forms includes a conveying device, which conveys the plastics material pre-forms along a pre-determined conveying path, and at least one heating device, which heats the plastics material pre-forms during the transportation thereof. The conveying path of the plastics material pre-forms extends at least locally through a sterile room, wherein the sterile room is separated from the environment by a plurality of walls.

14 Claims, 2 Drawing Sheets

APPARATUS FOR THE HEATING OF PLASTICS MATERIAL PRE-FORMS WITH STERILE ROOM

CROSS-REFERENCE TO RELATED APPLICATION

This application claims the benefit of priority of German Patent Application No. 10 2010 032 964.9, filed Jul. 30, 2010, pursuant to 35 U.S.C. 119(a)-(d), the disclosure of which is incorporated herein by reference.

TECHNICAL FIELD

The present disclosure relates to an apparatus for the warming or heating of plastics material pre-forms and, more particularly, an apparatus for heating plastics material pre-forms with sterile room.

BACKGROUND

So-called blow moulding machines, which shape plastics material pre-forms into plastics material containers by acting upon them with compressed air, are known from the prior art. For this purpose the plastics material pre-forms to be shaped are introduced into these blow moulding machines and are expanded there. As a rule the plastics material pre-forms are heated before entering the blow moulding machine in order to be expanded in the heated or soft state in this way. To this end, heating devices or furnaces, through which the plastics material pre-form passes and which heat the plastics material pre-forms during this passage through, are known from the prior art.

So-called sterile applications in which the plastics material containers are filled under sterile conditions are also known from the prior art. For this purpose, the containers are sterilized on the inside and the outside in the usual way before the filling and they are conveyed through a clean room or sterile room during this passage through. These sterilization processes, however, are frequently relatively complicated.

It may therefore be desirable, in the case of containers to be treated in a sterile manner, to simplify the production thereof.

SUMMARY

According to various aspects of the disclosure, an apparatus for the heating of plastics material pre-forms has a conveying device which conveys the plastics material pre-forms along a pre-determined conveying path. In addition, at least one heating device is provided which heats the plastics material pre-forms during the transportation thereof along the conveying path.

According to the disclosure, the conveying path of the plastics material pre-forms extends at least locally through a sterile room, this sterile room being separated from the environment by at least one and, in some aspects, a plurality of walls.

It is thus proposed to allow not only the stages of filling the containers to take place under sterile conditions, but also the heating of the plastics material pre-forms. In this way, it would be possible for the plastics material pre-forms to be sterilized before their entry into the heating device or even to be produced immediately before their entry into the heating device, and, in this way, they can be kept sterile.

In some aspects, it may be desirable for at least one wall forming the sterile room to be made movable. It is thus possible for a wall of the sterile room to be moved jointly with the plastics material pre-forms. In this way, sterile rooms which are relatively small spatially and which are accordingly relatively simple to keep sterile can be formed. It would also be possible, however, for a sterile room to be made stationary and for example to surround the entire heating device.

It may also be advantageous for at least one wall separating the sterile room to be made stationary. The plastics material pre-forms for example can be supplied to the heating device by way of this stationary wall.

In the case of an exemplary embodiment, the conveying device has a rotatable carrier on which at least one holding element for holding the plastics material pre-forms is arranged. In this way, in a manner similar to filling or blow moulding machines, the heating device can be designed with a heating wheel on which at least one and, in some aspects, a plurality of holding elements are arranged by which the plastics material pre-forms are conveyed. In this case it may be advantageous—as mentioned above—for at least one wall of the aforesaid sterile room to be moved jointly with these heating elements. With this movement, therefore, the containers are moved along a circular or circular-segmental path. In this case it may be advantageous if that wall of the sterile room which is situated radially on the inside with respect to the containers is arranged so as to be movable and if that wall which is situated radially on the outside with respect to the containers to be heated is arranged so as to be stationary. In this case the conveying device advances the containers separately.

In the case of an exemplary embodiment the heating device has at least one microwave generation device. The embodiment by means of a sterile room, as described here, may be suitable in particular for heating the plastics material pre-forms by means of microwave heating devices, since in the case of heating devices of this type a considerable part of these heating devices in terms of space can be arranged at a distance from the plastics material pre-form to be heated.

It is pointed out, however, that the heating device can also be an infrared furnace. In addition, combinations of infrared and microwave heating elements would also be possible, for example in such a way that a pre-heating by infrared heating elements and a subsequent heating by microwave heating elements are carried out.

In the case of an exemplary embodiment at least one holding element for the plastics material pre-forms has a mandrel capable of being introduced into the aperture of the plastics material pre-forms. With this embodiment, therefore, the containers are guided on the inside at the apertures thereof. It would also be possible, however, for the containers to be guided on the carrier ring thereof by means of clamps for example. It may be advantageous for the plastics material pre-forms to be conveyed in such a way the apertures thereof are not heated. In this way, it is possible, for example, for the plastics material pre-forms to be inserted from above into a microwave heating device or a resonator respectively and to be heated there.

In the case of an exemplary embodiment the apparatus has a sealing device which is arranged between at least one movable wall and a stationary wall of the sterile room. As a result of this procedure it is possible for the sterile room to be sealed off from its surroundings. In this case the sealing device used can be in the form of a so-called surge tank for example, which has an annular duct which is filled with liquid and which is arranged so as to be stationary for example and in which an element of the movable wall slides in such a way that air or a gas cannot penetrate from the sterile room to the outside.

In the case of an exemplary embodiment the sterile room is designed in the manner of a duct around the conveying path of the plastics material pre-forms. In this way, as mentioned above, the volume of the sterile room can be kept small. This sterile room can thus be designed in the manner of a hose or even in the form of a ring or torus in the case of a circular movement about the conveying path of the plastics material pre-forms.

In the case of an exemplary embodiment at least one heating device is arranged at least in part outside the sterile room. If a microwave heating device is used for example, the magnetron of this microwave heating device could be arranged outside the sterile room, the wave guide could be introduced into the sterile room and the resonator could be arranged in the interior of the sterile room.

It may be advantageous for the apparatus to have at least one drive for rotating the plastics material pre-forms about the longitudinal axis thereof. In addition, it may be advantageous for a driving device to be provided which also moves the plastics material pre-forms in a direction at a right angle to their conveying path, for example in order to introduce them into a resonator of the heating device.

In addition, the present disclosure relates to a plant for shaping plastics material pre-forms into plastics material containers with an apparatus of the type described above, as well as a shaping device for shaping the plastics material pre-forms into plastics material containers which is arranged in a conveying device of the plastics material containers downstream of the apparatus. It may be advantageous for the shaping device to have a sterile room, inside which the plastics material containers are conveyed during the shaping procedure and for this sterile room to be attached—at least indirectly and in some aspects by way of a further sterile room—to the sterile room of the apparatus for heating the plastics material pre-forms.

This can ensure that contamination of the plastics material pre-forms no longer occurs between the heating device and the shaping device. In this way, it would be possible for the heating device and the shaping device to be arranged in a common casing or sterile room, but it would also be possible for the two sterile rooms to be separate from each other and for the plastics material pre-forms to be transferred from one sterile room into the other sterile room without contact with the surroundings, for example by way of conveying star wheels or switching devices.

In the case of an exemplary embodiment a further sterilization device for sterilizing the (heated) plastics material pre-forms is arranged between the heating device for the plastics material pre-forms and the shaping device.

In addition, the present disclosure relates to a method of shaping plastics material pre-forms into plastics material containers, in which plastics material pre-forms are conveyed along a pre-set conveying path through a heating device and are heated during this transportation and following the heating they are shaped by a shaping device to form plastics material containers. According to the disclosure, during the heating the plastics material containers are conveyed at least at a distance through a sterile room. It is thus also proposed with respect to the method that the plastics material pre-forms should be guided through a sterile room while they are being heated.

It may be advantageous for the apparatus specified above to have a sterilization device for sterilizing the plastics material pre-forms. In this case the sterilization of these plastics material pre-forms is carried out during the heating thereof.

Nozzle devices for example would be used in this case, but it would also be possible for emitters for electron radiation to be used.

In the case of exemplary embodiment the apparatus has a cleaning device in order to clean the apparatus itself. In this case, for example, nozzles can be provided which act upon wall regions of the sterile room with a sterilizing medium. It is possible both for nozzles of this type to be arranged on the movable walls, in order to clean the stationary walls or stationary elements in general, and nozzles which are arranged on the stationary walls or on stationary elements of the apparatus and which clean the walls which are movable in each case. In this way, a so-called CIP cleaning (cleaning in place) of the apparatus is possible.

Further exemplary embodiments and advantages may be evident from the accompanying drawings.

DETAILED DESCRIPTION

Figure 1:
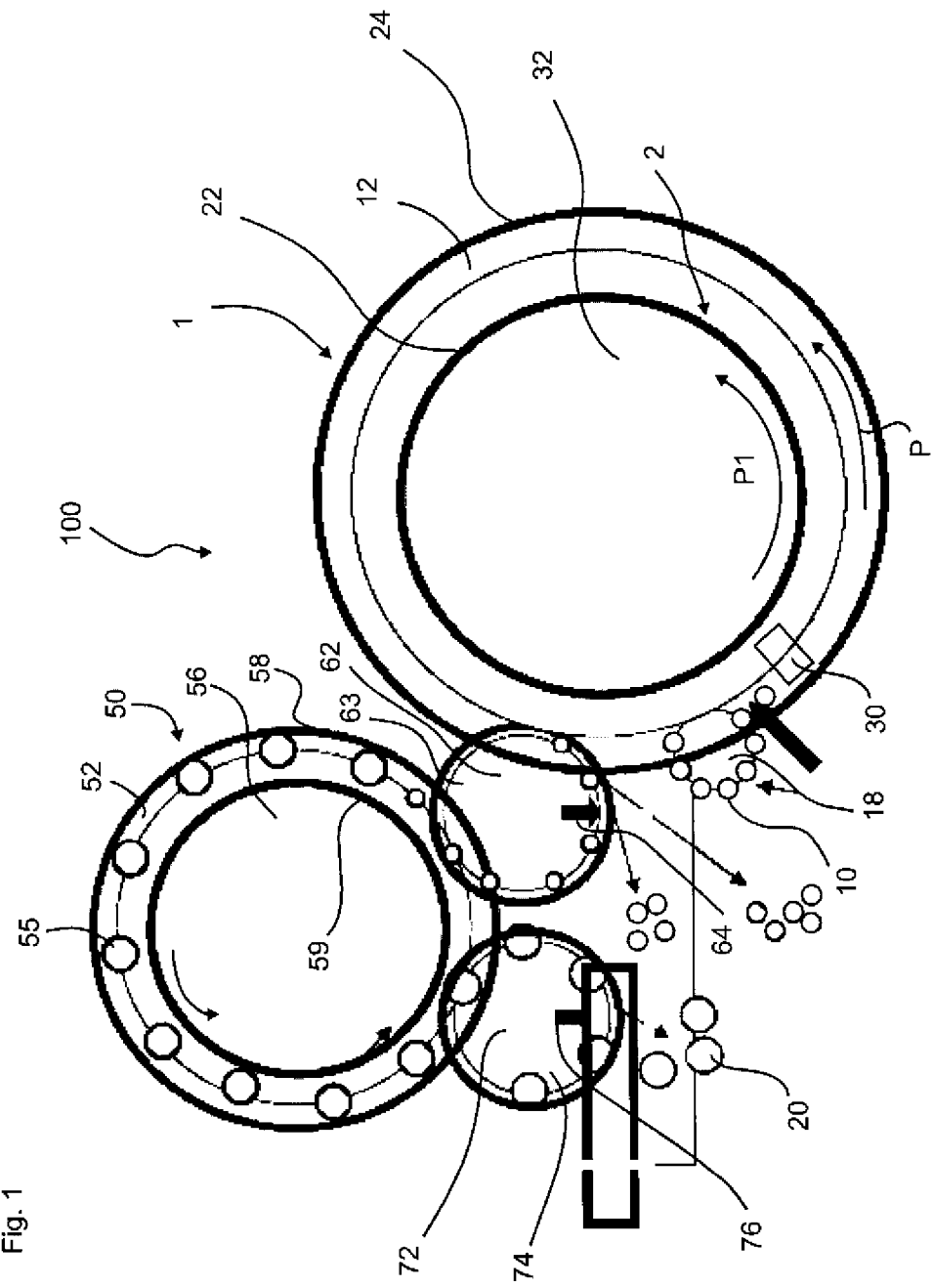
FIG. 1 shows an exemplary plant according to various aspects of the disclosure for the treatment of containers.

FIG. 1 is a diagrammatic illustration of an exemplary plant 100 according to the disclosure for the treatment of containers. In this case plastics material pre-forms 10 are supplied by way of a supply wheel 18 to an apparatus designated 1 in its entirety for the heating of plastics material pre-forms. This apparatus 1 for the heating of plastics material pre-forms has a carrier 32 which is rotatable as shown by the arrow P1 and on which a plurality (not shown) of heating devices for heating plastics material pre-forms are arranged. In this case the carrier 32 is thus a component part of a conveying device designated 2 in its entirety for conveying the plastics material pre-forms.

In this case the containers are moved on the carrier 32 along a conveying path P, i.e. along a circular conveying path P here. The reference number 12 relates to a sterile room which is illustrated only diagrammatically and inside which the containers are conveyed during the complete heating procedure. This sterile room 12 is bounded in this case by an inner wall 22 and an outer wall 24. In this way, the volume of the sterile room 12 can be kept relatively small as compared to the entire size of the apparatus 1. In this case the sterile room 12 thus has an annular (segmental) cross-section.

Following the heating, the plastics material pre-forms are transferred to a blow moulding machine 50 by way of a transfer wheel 62. The reference number 64 designates an ejection device which separates out defective pre-forms or incorrectly heated pre-forms. The blow moulding machine has in turn a blowing wheel 56 with a plurality of blowing stations 55 arranged in it. Inside these blowing stations 55 the plastics material pre-forms are expanded to form plastics material containers. In addition, the blow moulding machine 50 in this case forms an annular sterile room 52 which in turn is bounded by a stationary wall 58 and a movable wall 59. The reference number 63 designates a further sterile room in which the containers are conveyed during the transfer from the apparatus 1 to the blow moulding machine 50.

The blow moulding machine 50 is followed by a removal device 72, by way of which the plastics material containers are removed. In this case this removal device 72 too has a conveying star wheel 74 as well as an ejection device which in turn is used to separate out defectively formed containers 20. This blow moulding machine can have attached to it for example a filling machine which fills with a liquid the containers which have now been produced.

The reference number 30 designates a sterilization device which sterilizes the plastics material pre-forms entering the apparatus 1, for example by acting upon them with a sterilizing medium. In this case this sterilization device 30 can be designed so as to be movable, i.e. to move jointly with the containers, or it can also be stationary.

Figure 2:
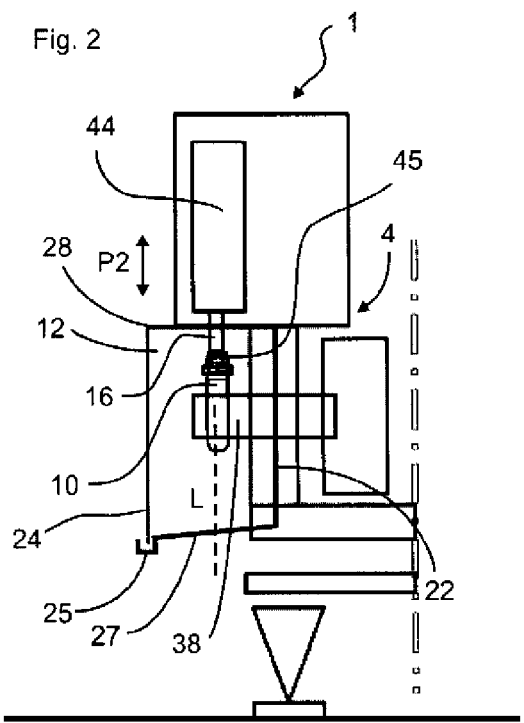
FIG. 2 is a detailed illustration of an exemplary apparatus according to various aspects of the disclosure.

FIG. 2 is a detailed illustration of an exemplary apparatus 1 according to the disclosure. In this case a holding element 45 is provided which enters into an aperture of the plastics material pre-forms 10 and holds and conveys them in this way. The reference number 44 designates a drive which causes a rotation of the plastics material pre-forms 10 about the longitudinal axis thereof. In addition, a lifting and/or lowering movement of the plastics material pre-form 10 along the arrow P2 can be achieved by means of the drive 44. The reference number 16 designates roughly diagrammatically a folding bellows which is used for sealing off this lifting movement, so that the lifting movement can also take place inside the sterile room 12.

The reference number 4 designates in its entirety the heating device for heating the plastics material pre-forms.

Figure 3:
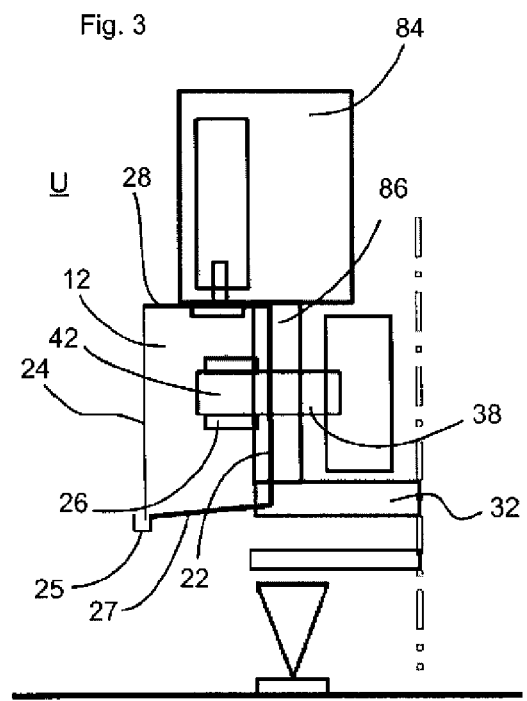
FIG. 3 is a further detailed illustration of an exemplary apparatus according to various aspects of the disclosure.

FIG. 3 is a further illustration of the apparatus shown in FIG. 2. Here, as also in FIG. 2, the sterile room 12 is shown which in this case is formed by a stationary outer wall 24 and a movable wall 22. The reference number 25 designates roughly diagrammatically a sealing device for sealing off the movement of the movable wall 22 with respect to the stationary wall 24. This can be, as mentioned above, a so-called surge tank. The reference number 27 designates a lower wall which bounds the sterile room 12 at the bottom and the reference number 28 designates an upper wall which bounds the sterile room 12 at the top.

In this case the lower wall 27 and the upper wall 28 are preferably movable, i.e. they rotate jointly with the containers. In addition, a sealing device (not shown) can be provided between the upper wall 28 and the outer (stationary) wall 24. In this case the lower wall 27 and the upper wall 28 can be formed in one piece with the inner movable wall 22. In addition, a supply device (not shown) can also be provided, which introduces a sterile medium such as for example sterile air into the sterile room 12, in which case it may be advantageous for the pressure of the sterile medium inside the sterile room 12 to be kept higher than a surrounding pressure in the surroundings U outside the sterile room 12.

The reference number 84 designates a component part of the heating device, such as for example a magnetron, which generates microwaves. The reference number 86 designates a waveguide which guides the microwaves to a resonator 42 by way of a further waveguide 38. The plastic preforms are heated by being acted upon with microwave within the resonator 42. The reference number 26 designates closure caps for closing off the resonator 42 at the top and bottom for cleaning purposes.

Figure 4:
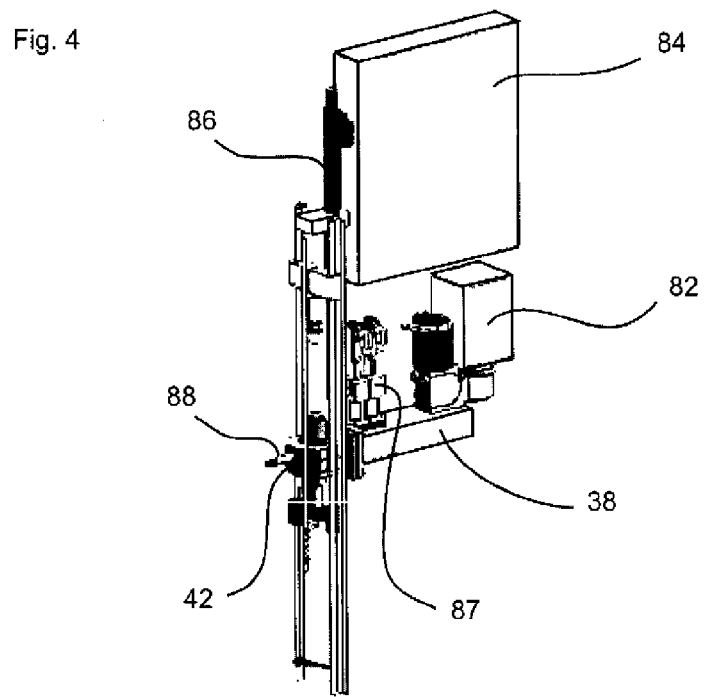
FIG. 4 is a further illustration of an exemplary heating device.

FIG. 4 is a further illustration of the heating device. Here, in particular, a cleaning of the resonator 42 is illustrated. In this case a cleaning medium, which is kept available in a reservoir 82, can be introduced through the waveguide 86, 38. The reference number 87 designates tuning elements for tuning the resonator or the microwave power, for example so-called tuning pins which are capable of being introduced into the waveguide 38.

The reference number 88 designates a sensor device which may advantageously set a heating of the plastics material pre-forms without contact.

The embodiments shown in FIGS. 3 and 4 thus permit a so-called CIP cleaning (cleaning in place) of the respective resonators 42.

It will be apparent to those skilled in the art that various modifications and variations can be made to the apparatus for the heating of plastics material pre-forms with sterile room of the present disclosure without departing from the scope of the invention. Throughout the disclosure, use of the terms "a," "an," and "the" may include one or more of the elements to which they refer. Other embodiments of the invention will be apparent to those skilled in the art from consideration of the specification and practice of the invention disclosed herein. It is intended that the specification and examples be considered as exemplary only.

What is claimed is:

1. An apparatus for the heating of plastics material pre-forms, comprising:
    a conveying device which conveys the plastics material pre-forms along a predetermined conveying path; and
    at least one heating device which heats the plastics material pre-forms during the transportation along said predetermined path, said predetermined conveying path of the plastics material pre-forms extending at least locally through a sterile room such that said heating takes place in the sterile room, the sterile room being separated from the environment by a plurality of walls.

2. An apparatus according to claim 1, wherein at least one of said plurality of walls bounding the sterile room is made movable.

3. An apparatus according to claim 1, wherein at least one of said plurality of walls separating the sterile room is made stationary.

4. An apparatus according to claim 1, wherein the conveying device has a rotatable carrier on which at least one holding element for holding the plastics material pre-forms is arranged.

5. An apparatus according to claim 1, wherein the heating device has a microwave generation device.

6. An apparatus according to claim 1, further comprising at least one drive for rotating the plastics material pre-forms about the longitudinal axis thereof.

7. An apparatus according to claim 4, wherein said at least one holding element has a mandrel capable of being introduced into the aperture of the plastics material pre-forms.

8. An apparatus according to claim 1, further comprising a sealing device arranged between at least one movable wall and a stationary wall of the sterile room.

9. An apparatus according to claim 1, wherein the sterile room comprises a duct around the conveying path of the plastics material pre-forms.

10. An apparatus according to claim 1, wherein at least one of said heating devices is arranged at least in part outside the sterile room.

11. An apparatus according to claim 1, further comprising a sterilization device for sterilizing the plastics material pre-forms.

12. A plant for shaping plastics material pre-forms into plastics material containers, the plant comprising:
    an apparatus according to claim 1; and
    a shaping device for shaping the plastics material pre-forms into plastics material containers which is arranged downstream of the apparatus in a conveying direction of the plastics material containers.

13. A plant according to claim 12, wherein the shaping device includes a sterile room, inside which the plastics material containers are conveyed during the shaping procedure and said sterile room follows—at least indirectly—the sterile room of the apparatus.

14. A method of shaping plastics material pre-forms into plastics material containers, the method comprising:
provide the apparatus of claim 1;
conveying plastics material pre-forms along a pre-set conveying path through a heating device;
heating said pre-forms during the conveying step; and
shaping said heated pre-forms, following the heating step, with a shaping device to form plastics material containers,
wherein during the heating step the plastics material pre-forms are conveyed at least locally through a sterile room.

* * * * *